(12) United States Patent
Lawlor et al.

(10) Patent No.: US 11,549,816 B2
(45) Date of Patent: Jan. 10, 2023

(54) SYSTEMS AND METHODS FOR CONTROLLING MAPPING INFORMATION INACCURACIES

(71) Applicant: HERE Global B.V, Eindhoven (NL)

(72) Inventors: David Lawlor, Chicago, IL (US); Zhanwei Chen, Xihua (CN); Anish Mittal, San Francisco, CA (US)

(73) Assignee: HERE GLOBAL B.V., Eindhoven (NL)

( * ) Notice: Subject to any disclaimer, the term of this patent is extended or adjusted under 35 U.S.C. 154(b) by 568 days.

(21) Appl. No.: 16/527,370

(22) Filed: Jul. 31, 2019

(65) Prior Publication Data

US 2021/0033404 A1 Feb. 4, 2021

(51) Int. Cl.
*G01C 21/32* (2006.01)
*G01C 21/36* (2006.01)
*G06N 20/00* (2019.01)
*G06V 10/20* (2022.01)
*G06V 20/56* (2022.01)

(52) U.S. Cl.
CPC ......... *G01C 21/32* (2013.01); *G01C 21/3638* (2013.01); *G06N 20/00* (2019.01); *G06V 10/255* (2022.01); *G06V 20/588* (2022.01)

(58) Field of Classification Search
None
See application file for complete search history.

(56) References Cited

U.S. PATENT DOCUMENTS

| 2017/0074659 | A1* | 3/2017 | Giurgiu | G01S 19/41 |
| 2017/0084037 | A1* | 3/2017 | Barajas Hernandez | G06K 9/00637 |
| 2020/0098135 | A1* | 3/2020 | Ganjineh | G06K 9/00818 |
| 2020/0386567 | A1* | 12/2020 | Igarashi | G08G 1/0145 |

FOREIGN PATENT DOCUMENTS

KR 101894571 B1 9/2018

OTHER PUBLICATIONS

Bansal et al., Geo-localization of street Views with Aerial Image Databases, (Nov. 28-Dec. 1, 2019) MM '11 Proceedings of the 19th ACM international conference on Multimedia, pp. 1125-1128. http://citeseerx.ist.psu.edu/viewdoc/download?doi=1 0.1.1.412.8629&rep=rep1&type=pdf.

(Continued)

*Primary Examiner* — James M McPherson
*Assistant Examiner* — Bakari Underwood
(74) *Attorney, Agent, or Firm* — Jeffrey R. Moisan; Here Global B.V.

(57) ABSTRACT

Systems and methods for correcting mapping information inaccuracies are described. In some aspects, the method includes receiving terrestrial data captured in an area of interest, and detecting features in the terrestrial data identifying ground points in the area of interest. The method also includes correlating the ground points with ground control points in the area of interest to determine a correspondence, and computing an aggregate of positional differences between corresponding points. The method further includes generating a report indicating a quality of the terrestrial data captured in the area of interest based on the aggregate.

20 Claims, 8 Drawing Sheets

(56) References Cited

OTHER PUBLICATIONS

Zhu et al., Georeferencing Multi-Temporal and Multi-Scale Imagery In Photogrammetry, (Jul. 2008) Laboratory of Photogrammetry and Remote Sensing, Helsinki University of Technology, http://citeseerx.ist.psu.edu/viewdoc/download?doi=10.1.1.155.98&rep=rep1&type=pdf.

Wu et al., Integration of Aerial Oblique Imagery and Terrestrial imagery for optimized 3d Modeling in urban Areas, (2018). ISPRS Journal of Photogrammetry and Remote Sensing. 139. 119-132. https://www.researchgate.net/profile/Han_Hu10/publication/324868747_Integration_of_aerial_oblique_imagery_and_terrestrial_imagery_for_optimized_3D_modeling_in_urban_areas/links/5b46f98d45851519b4b08f94/Integration-of-aerial-oblique-imagery-and-terrestrial-imagery-for-optimized-3D-modeling-in-urban-areas.pdf?origin=public_detail.

* cited by examiner

SYSTEMS AND METHODS FOR CONTROLLING MAPPING INFORMATION INACCURACIES

BACKGROUND

The present disclosure relates generally to mapping applications and services, and more specifically to systems and methods for controlling mapping information inaccuracies.

Developments in machine learning, computer vision, and processing power have allowed many advanced technologies, like autonomous driving, to quickly become a reality. However, as perceptual and computational abilities have improved, so too has the need for more accurate, up-to-date and detailed digital mapping data. For example, autonomous vehicles are envisioned to perform driving functions in very complicated urban environments. This would require complex path planning and high-accuracy information about vehicle surroundings (e.g. centimeter-level or better). In addition, knowledge about what to expect beyond a vehicle's perceptual horizon (e.g. objects not directly visible) would also be necessary to reliably obey driving rules and avoid collisions.

Map service providers often assemble digital maps using data from various sources in order to achieve the accuracy needed for mapping applications, such as autonomous driving. In particular, terrestrial data is commonly captured using surveying vehicles equipped with a number of sensors, such as cameras, global positioning system (GPS) sensors, inertia monitoring units (IMUs), light detection and ranging (LIDAR) sensors, depth sensors, and so forth. However, such data is often subject to a number of errors. For example, GPS signals can become distorted in complicated urban environments, which can lead to localization errors of up to 30 meters. Although other sensors could be used to improve localization (e.g. by accounting for vehicle movement using IMUs), such sensor data can drift and be insufficient for required accuracies of localization.

To determine whether acquired terrestrial data is appropriate for a particular application, current techniques analyze the data post-capture. This approach, however, has several drawbacks. For instance, the process of identifying inadequate data can be painstaking, particularly for mapping applications at large scales. This is because, absent an indication of any specific data to target, large amounts of data must be analyzed successively. In addition, evaluating the data post-capture can be unnecessarily costly since inadequate data would still need to be acquired and stored.

Accordingly, content providers face significant technical challenges and need improved approaches for use in mapping applications and services, as well as other applications.

SUMMARY

The present disclosure overcome the shortcomings of prior technologies. In particular, a novel approach for controlling mapping information inaccuracies is provided, as detailed below.

In accordance with aspect of the disclosure, a method for controlling mapping information inaccuracies is provided. The method includes receiving terrestrial data captured in an area of interest, and detecting features in the terrestrial data identifying ground points in the area of interest. The method also includes correlating the ground points with ground control points in the area of interest to determine a correspondence, and computing an aggregate of positional differences between corresponding points. The method further includes generating a report indicating a quality of the terrestrial data captured in the area of interest based on the aggregate In accordance with another of the disclosure, a system for controlling mapping information inaccuracies is provided. The system includes at least one processor, at least one memory comprising instructions executable by the at least one processor, the instructions causing the system to receive terrestrial data captured in an area of interest, and detect features in the terrestrial data identifying ground points in the area of interest. The instructions also cause the system to correlate the ground points with ground control points in the area of interest to determine a correspondence, and compute an aggregate of positional differences between corresponding points. The instructions further cause the system to generate a report indicating a quality of the terrestrial data captured in the area of interest based on the aggregate. The system also includes a display for providing the report to a user.

In yet another aspect of the present disclosure, a non-transitory computer-readable medium for controlling mapping information inaccuracies. When executed by one or more processors, instructions stored in the non-transitory computer-readable medium causes an apparatus to receive terrestrial data captured in an area of interest, and detect features in the terrestrial data identifying ground points in the area of interest. The instructions also cause the apparatus to correlate the ground points with ground control points in the area of interest to determine a correspondence, and compute an aggregate of positional differences between corresponding points. The instructions further cause the apparatus to generate a report indicating a quality of the terrestrial data captured in the area of interest based on the aggregate.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The present invention will hereafter be described with reference to the accompanying figures, wherein like reference numerals denote like elements. The embodiments of the invention are illustrated by way of example, and not by way of limitation, in the accompanying drawings.

DETAILED DESCRIPTION

Accurate information is important to a variety of mapping applications and map services because imprecision could present safety hazards, instill a lack of consumer confidence, and reduce product reliability. For instance, many mapping products utilize terrestrial data captured during a drive. However, correcting terrestrial data using conventional methods can be time-consuming and utilize valuable resources.

The present disclosure describes a solution to address these technical challenges. Specifically, systems and methods are provided herein for controlling mapping information inaccuracies. In accordance with some aspects of the disclosure, an aggregate may be used to quantify the quality of terrestrial data, and inform a need for correcting or updating the data. As will be appreciated by those skilled in the art, the present approach provides a number of advantages over prior methodologies. For instance, systems and methods described herein may be used to provide automatic and scalable detection of inadequate data, and correct information derived therefrom. In addition, the ability to identify inadequate data in real-time can provide substantial cost savings and improve mapping or map-making processes.

In the following description, and for the purposes of explanation, numerous specific details are set forth to provide a thorough understanding of the embodiments of the invention. It should be apparent to one skilled in the art, however, that the embodiments of the invention may be practiced with or without these specific details, or with equivalent arrangements. In other instances, well-known structures and devices are shown in block diagram form in order to avoid unnecessarily obscuring the embodiments of the invention.

Figure 1:
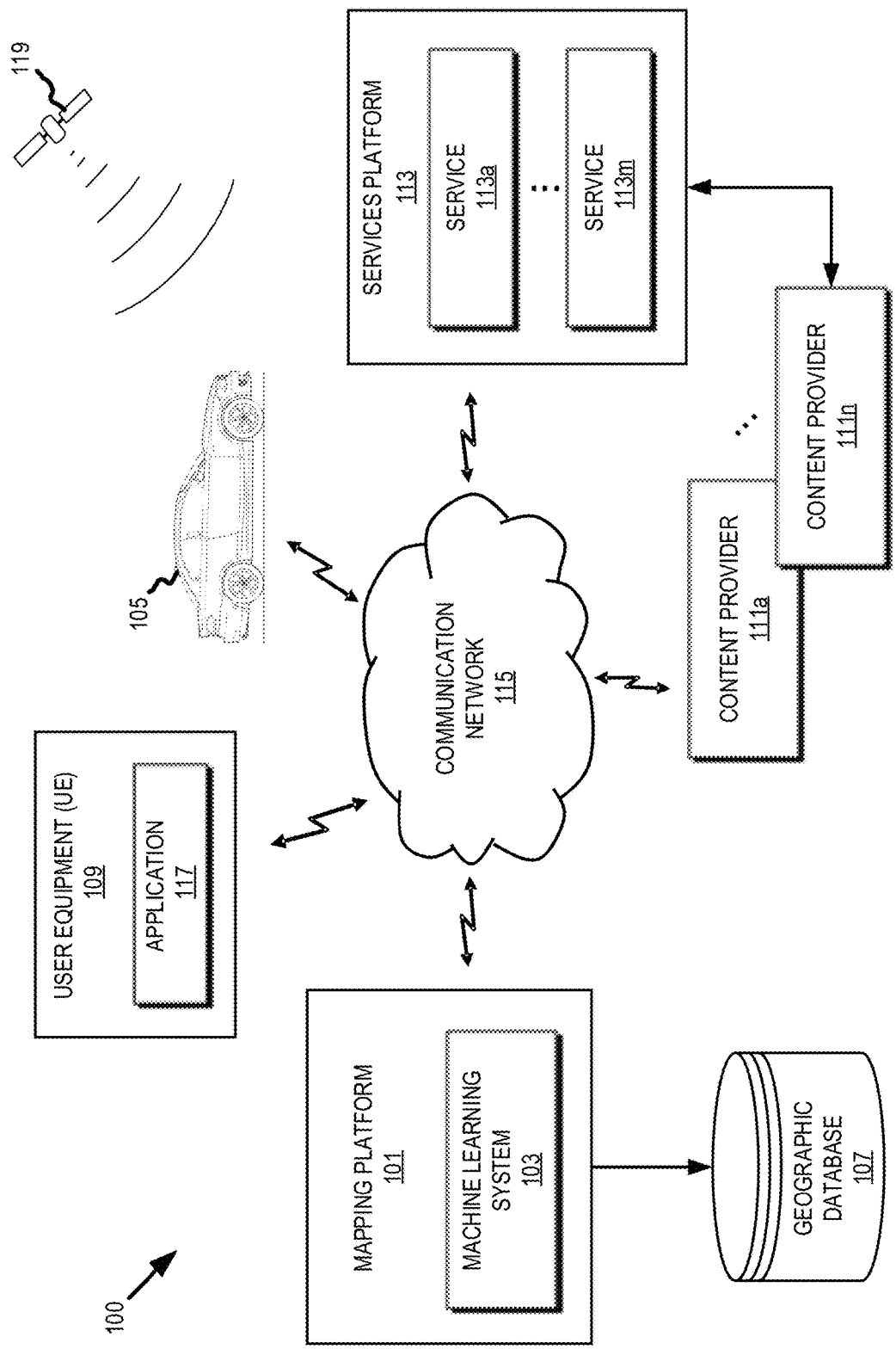
FIG. 1 is a diagram of an example system, in accordance with aspects of the present disclosure.

Referring particularly to FIG. 1, a schematic diagram of a system 100, in accordance with aspects of the present disclosure, is shown. In general, the system 100 may be any device, apparatus, system, or a combination thereof, that is configured to carry out steps for controlling mapping information inaccuracies. Specifically, the system 100 may include, be part of, or operate in collaboration with, various computers, systems, devices, machines, mainframes, networks, servers, databases, and so forth. In some embodiments, the system 100 may also include portable or mobile terminals or devices, such as cellular phones, smartphones, laptops, tablets, and the like. In this regard, the system 100 may be designed to integrate a variety of hardware, software, and firmware with various capabilities and functionalities. In addition, the system 100 may be capable of operating autonomously or semi-autonomously.

In some embodiments, the system 100 may include a mapping platform 101 configured to generate and process a variety of mapping information and data, as well as carry out steps in accordance with methods described herein. In addition, mapping platform 101 may also communicate and exchange information and data with a variety of other systems, devices and hardware. For instance, as shown in FIG. 1, the mapping platform 101 may communicate with one or more vehicle(s) 105, geographic database(s) 107, user equipment (UE) 109, content provider(s) 111, and/or services platform(s) 113 by way of a communication network 115.

To carry out processing steps, in accordance with aspects of the present disclosure, the mapping platform 101, and components therein, may execute instructions stored in a non-transitory computer-readable medium (not shown in FIG. 1). The non-transitory computer-readable medium may be part of a memory, database, or other data storage location (s). To execute the instructions, the mapping platform 101 may include, and utilize a programmable processor, or combination of programmable processors. Alternatively, or additionally, the mapping platform 101, and components therein, may also include and utilize one or more dedicated processors, or processing units, modules or systems specifically configured (e.g. hardwired, or programmed) to carry out steps, in accordance with methods described herein. In addition, the mapping platform 101 may further include, and/or share, a variety of interconnected components, including servers, intelligent networking/computing devices and other components, as well as corresponding software and/or firmware. By way of example, processing steps may be carried out using any combination of central processing units (CPUs), graphics processing units (GPUs), Digital Signal Processing (DSP) chips, Application Specific Integrated Circuits (ASICs), Field Programmable Gate Arrays (FPGAs), and so forth.

In some embodiments, the mapping platform 101 may include a machine learning system 103, as illustrated in FIG. 1. Although the machine learning system 103 is shown as being part of the mapping platform 101, the machine learning system 103 may be a stand-alone system. Alternatively, the machine learning system 103 may be a part of the vehicle 105, UE 109, services platform 113 or services 113a-m, or a combination thereof.

The machine learning system 103 may be configured to detect certain objects or features depicted in images, and utilize various algorithms (e.g. machine learning algorithms) implemented using various computing architectures. In some implementations, the machine learning system 103 may include one or more neural networks configured to make predictions based on various machine learning models. For example, the machine learning system 103 may include a neural network, such as a convolutional neural network, having multiple layers and neurons. Also, the machine learning system 103 may include receptive fields of a collection of neuron(s) (e.g., a receptive layer) configured to correspond to the area of interest in inputted imagery or data.

In some aspects, the machine learning system 103 may be configured to detect learnable features from imagery (e.g. top-down images, terrestrial images, and so forth), as well as identify various target points based on the features. For instance, target points may include ground points or ground control points, as described below. The imagery can be obtained from a variety of different sources. For example, the imagery may be captured using aerial vehicles (e.g. airplanes, drones, and so forth), terrestrial vehicles (e.g. mapping vehicles, and the like), satellites, ground surveyors, device end-users, and using other equipment or methods. As described below, features are learnable if they can be used to effectively train a machine learning algorithm to make predictions.

In some aspects, learnable features or target points can be marked or labeled in a large of set of training images. Labeling involves identifying pixels within a given image that correspond to the point or feature. Labeling may be performed automatically using various techniques, manually by a human labeler, a combination of both. The labeled training images may be used to train the machine learning algorithms to find the target points or features in new imagery (i.e., predicting the pixel locations associated with points or features in the input images). In addition to generating data (e.g., location data) corresponding to detected points or features, the machine learning system 103 may also be configured to generate confidence values/uncertainties for the data (e.g. confidence or uncertainty in location).

In some implementations, the machine learning system 103 may be trained to automatically label imagery depicting areas to be mapped or analyzed. In addition, three-dimensional (3D) coordinates of target points or features can be estimated using multiple views, whereby corresponding points or features are labeled in two or more images (e.g. terrestrial, aerial, and so forth). To this end, the mapping platform 101 and/or machine learning system 103 can determine pixel correspondences between various target points labeled in each of the images. The 3D coordinates can then be determined via a triangulation process from the pixel correspondences in combination with various camera information (e.g., model, position, pointing direction or pose, etc.) of the camera system used to capture the images. Since different sources (e.g., satellites, airplanes, drones, etc.) often provide imagery of different quality and resolution, and uncertainty/error associated with the generated target points may also be computed.

Referring again to FIG. 1, the mapping platform 101 may have connectivity or access to a geographic database 107. Specifically, the geographic database 107 may store various geographical data and information in a variety of forms and formats. For instance, in one embodiment, the geographic database 107 may include images or image data (e.g. terrestrial, aerial, and so forth). The geographic database 107 may also include other geographical data and information, including representations of features or points (e.g. ground points or ground control points) for use in determining a quality of the terrestrial data captured in the area of interest, as well as facilitating visual odometry and increasing localization accuracy.

In addition, the mapping platform 101 may also communicate with UE 109 and/or a vehicle 105. In one embodiment, the UE 109, or alternatively the vehicle 105, may execute an application 117 (e.g. a software application) configured to carry out steps in accordance with methods described here. For instance, in one non-limiting example, the application 117 may carry out steps for capturing terrestrial data in an area of interest, determining and reporting a quality of the terrestrial data captured. As described, identifying the quality of data is advantageous for controlling mapping information inaccuracies. In another non-limiting example, application 117 may also be any type of application that is executable on the UE 109 and/or vehicle 105, such as autonomous driving applications, mapping applications, location-based service applications, navigation applications, content provisioning services, camera/imaging application, media player applications, social networking applications, calendar applications, and the like. In yet another non-limiting example, the application 117 may act as a client for the machine learning system 103, and perform one or more functions associated with determining a quality of the terrestrial data captured, either alone or in combination with the machine learning system 103.

By way of example, the UE 109 may be, or include, an embedded system, mobile terminal, fixed terminal, or portable terminal including a built-in navigation system, a personal navigation device, mobile handset, station, unit, device, multimedia computer, multimedia tablet, Internet node, communicator, desktop computer, laptop computer, notebook computer, netbook computer, tablet computer, personal communication system (PCS) device, personal digital assistants (PDAs), audio/video player, digital camera/camcorder, positioning device, fitness device, television receiver, radio broadcast receiver, electronic book device, game device, or any combination thereof, including the accessories and peripherals of these devices, or any combination thereof. It is also contemplated that the UE 109 may support any type of interface with a user (e.g. by way of various buttons, touch screens, consoles, displays, speakers, "wearable" circuitry, and other I/O elements or devices). Although shown in FIG. 1 as being separate from the vehicle 105, in some embodiments, the UE 109 may be integrated into, or part of, the vehicle 105.

In some embodiments, the UE 109 and/or vehicle 105 may include various sensors for acquiring a variety of different data or information. For instance, the UE 109 and/or vehicle 105 may include one or more camera/imaging devices for capturing imagery (e.g. terrestrial images), global positioning sensors (GPS) for gathering location or coordinates data, network detection sensors for detecting wireless signals, receivers for carrying out different short-range communications (e.g., Bluetooth, Wi-Fi, Li-Fi, near field communication (NFC) etc.), temporal information sensors, audio recorders for gathering audio data, velocity sensors, switch sensors for determining whether one or more vehicle switches are engaged, and others.

The UE 109 and/or vehicle 105 may also include light sensors, height sensors and accelerometers (e.g., for determining acceleration and vehicle orientation), tilt sensors (e.g. for detecting the degree of incline or decline), moisture sensors, pressure sensors, and so forth. Further, the UE 109 and/or vehicle 105 may also include sensors for detecting the relative distance of the vehicle 105 from a lane or roadway, the presence of other vehicles, pedestrians, traffic lights, potholes and any other objects, or a combination thereof. Other sensors may also be configured to detect weather data, traffic information, or a combination thereof. Yet other sensors may also be configured to determine the status of various control elements of the car, such as activation of wipers, use of a brake pedal, use of an acceleration pedal, angle of the steering wheel, activation of hazard lights, activation of head lights, and so forth.

In some embodiments, the UE 109 and/or vehicle 105 may include GPS or other satellite-based receivers configured to obtain geographic coordinates from a satellite 119 (FIG. 1) for determining current location and time. Further, the location can be determined by visual odometry, triangulation systems such as A-GPS, Cell of Origin, or other location extrapolation technologies.

The mapping platform 101 may also have connectivity with various content providers 111. Each content provider 111a-111n may send, or provide access to, various information or data to the machine learning system 103, vehicle 105, geographic database 107, user equipment 109, the services platform 113, and any combination thereof. The content provided may include map content (e.g., geographic data, parametric representations of mapped features, and so forth), textual content, audio content, video or image content (e.g. terrestrial image data), and so forth. In some implementations, the providers 111 may send, or provide access to, information or data for detecting and classifying lane lines and/or other features/target points in image data, and estimating the quality of the detected features. In some implementations, the providers 111 may also receive and store content from the machine learning system 103, vehicle 105, geographic database 107, UE 109, services platform 113, and any combination thereof. The content providers 111 may also manage access to a central repository of data, and offer a consistent, standard interface to data, such as a repository of the geographic database 107.

As shown in FIG. 1, the mapping platform 101 may further connect over the communication network 115 to the services platform 113 (e.g. a third-party platform), which may provide one or more services 113a-m. By way of example, the services platform 113 may provide mapping services, navigation services, travel planning services, notification services, social networking services, content (e.g., audio, video, images, etc.) provisioning services, application services, storage services, contextual information determination services, location based services, information based services (e.g., weather, news, etc.), and so forth. In one embodiment, the services platform 113 may use the output of the machine learning system 103 (e.g., ground control point data) to localize the vehicle 105 or UE 109 (e.g., a portable navigation device, smartphone, portable computer, tablet, etc.), and provide services such as navigation, mapping, other location-based services, and so forth.

The communication network 115 may include any number of networks, such as data networks, wireless networks, telephony networks, or combinations thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

By way of example, the mapping platform 101, machine learning system 103, vehicle 105, geographic database 107, UE 109, content provider 111, and services platform 1113 may communicate with each other, and other components of the system 100, using various communication protocols. In this context, a protocol may include a set of rules defining how the network nodes within the communication network 115 interact with each other based on information and data sent over the communication links. The protocols may be effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information and data over a network are described in the Open Systems Interconnection (OSI) Reference Model.

Communications between the network nodes may be carried out by exchanging discrete packets of data. Each packet may comprise (1) header information associated with a particular protocol, and (2) payload information that follows the header information and contains information that may be processed independently of that particular protocol. In some protocols, the packet may include (3) trailer information following the payload and indicating the end of the payload information. The header may include information such as the source of the packet, its destination, the length of the payload, and other properties used by the protocol. The data in the payload for the particular protocol may include a header and payload for a different protocol associated with a different, higher layer of the OSI Reference Model. The header for a particular protocol may indicate a type for the next protocol contained in its payload. The higher layer protocol is said to be encapsulated in the lower layer protocol. The headers included in a packet traversing multiple heterogeneous networks, such as the Internet, may include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
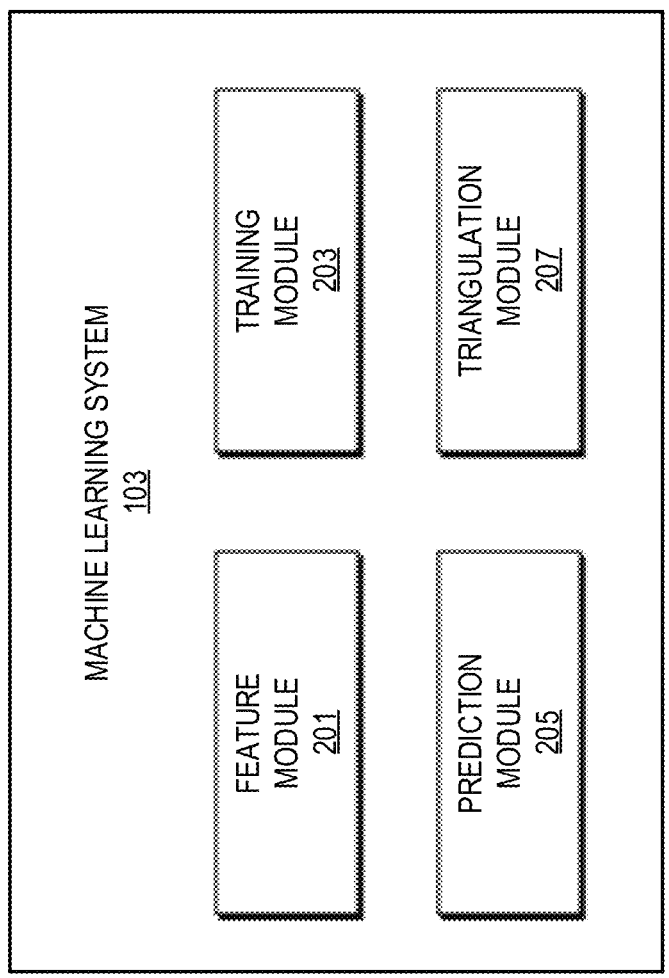
FIG. 2 is a diagram of an example machine learning system, in accordance with aspects of the present disclosure.

Referring now to FIG. 2, a schematic diagram of an example machine learning system 103, in accordance with aspects of the present disclosure, is illustrated. As shown, in some embodiments, the machine learning system 103 may include a feature module 201, a training module 203, a prediction module 205, and a triangulation module 207. The modules can be implemented using various hardware, firmware, software, as described with reference to the mapping platform 101 in FIG. 1. Alternatively, or additionally, modules may also be implemented as a cloud-based service, local service, native application, or combination thereof. Although the modules in FIG. 2 are shown as separate components of the machine learning system 103, it is contemplated that their respective functions may be readily combined into fewer modules, or further separated into more modules.

In some implementations, the feature module 201 may be configured to carry out a feature detection process to detect target features. To do so, the feature module 201 may utilize a variety of object recognition algorithms, including various machine learning algorithms. However, not all features may be suitable for machine learning (i.e. learnable, as described below). Therefore, in some aspects, the feature module 201 may also be configured to evaluate candidate features and select appropriate features. To this end, the feature module 201 may determine whether a candidate feature is learnable, for instance. Features may be selected during an initial phase of training a machine learning algorithm. The feature module 201 may also receive input from a user or system administrator in selecting suitable features.

Features selected by the feature module 201 may include various physical or environmental landmarks, such as landmarks identifiable on the ground. For instance, in some non-limiting examples, intersection features may be selected. Herein, an intersection refers to a geographic area in which two or more road segments intersect, converge, and/or diverge. Intersection features can then be defined based on various roadway markings, including lines, line intersections, angles, boundaries, points, and other markings found at intersections.

Figure 3:
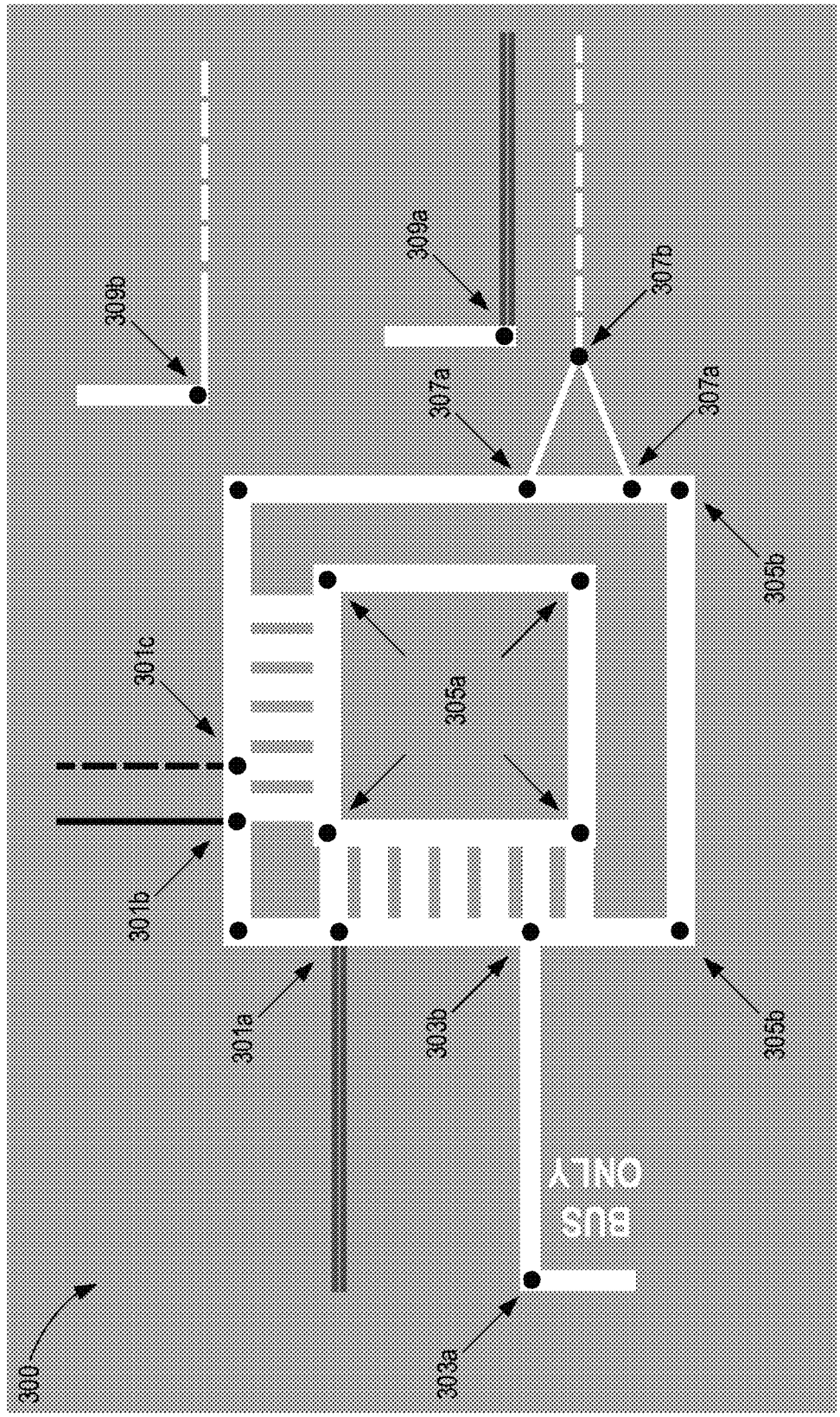
FIG. 3 is an illustration show example intersection features, in accordance with aspects of the present disclosure.

By way of example, FIG. 3 illustrates possible intersection features that can be found at a typical intersection 300. These intersection features may include:

Points where lane boundaries meet a crosswalk (e.g. 301a-301c);

Corner points corresponding to a bus stop (e.g. 303a, 303b);

Corner points corresponding to a crosswalk (e.g. 305a, 305b);

Gore points where a gore touches a crosswalk or limit line (e.g. 307a, 307b, respectively); and Points where a limit line meets a lane boundary (e.g. 309a, 309b).

The above-listed intersection features may be used to generate ground points or ground control points, in accordance with aspects of the present disclosure. It is noted, however, that these intersection features are mere examples of features that can meet the learnable criteria (described below). Thus, it is contemplated that any types of points, landmarks or features with various curvilinear geometries may be used.

In some aspects, intersection features may be detected by the feature module 201 using terrestrial imagery. The imagery may be captured using stationary cameras, or using cameras mounted on a terrestrial vehicle, for example. Information about the cameras (e.g. pose, position, focal length, camera model or type, and so forth), as well as environmental information or attributes under which the imagery is acquired (e.g., weather, time of day, and so on) may be used in the analysis and feature detection processes. In other aspects, intersection features may be additionally, or alternatively, detected using top-down imagery. In particular, top-down imagery is generally captured from an overhead or aerial perspective using one or more cameras mounted on an aerial vehicle (e.g. drone, airplane, and so forth) or satellite. In top-down imagery, cameras are typically pointed downwards, and oriented perpendicularly or at an oblique angle with respect to the plane of the ground.

Intersection features may also be detected using various other data, including LiDAR data, depth data and so forth. The feature module 201, and other elements of the machine learning system 103, may then be appropriately configured to detect target features using such data.

As mentioned, learnable features are advantageous for training machine learning algorithms. In particular, a feature may be learnable if it satisfies one or more of the following properties:

(1) The feature has a consistent definition;

(2) The feature is uniquely identifiable;

(3) The feature is spatially sparse;

(4) The definition of the feature is generalizable.

Consistent definitions allow for reliable feature identification and application. Consistency refers to whether a feature can be identified with an accuracy above a threshold. For example, an intersection feature may have a consistent definition if it may be correctly identified approximately 80% of the time, or 90% of the time, or more. Thus, the feature module 201 in FIG. 2 may be configured to determine whether a feature can be identified with an accuracy above a predetermined threshold value, and thereby determine whether it has a consistent definition suitable for learning.

Features may also be selected by the feature module 201 to be uniquely identifiable. That is, each feature may be advantageously classified under one feature definition category. For example, an intersection feature that is classified as "a lane boundary with a crosswalk" should not also satisfy the definition for being a "gore point," and vice versa. As such, if a feature is not uniquely identifiable, the feature module 201 can classify the feature as not learnable.

Features may also be advantageously selected based on whether they meet a sparsity criterion. For example, a feature that occurs in an area of interest fewer than a predetermined number of times may be desirable. As such, the feature module 201 may determine spatial sparsity of a feature, and classify the feature as learnable if it fulfills the sparsity criterion. By contrast, a feature that repeats often within the area of interest may not be suitable because it can be more difficult to identify it uniquely, and match against other features. For example, dashes of a lane line, stripes in a crosswalk, multiple line paint intersections in restricted zones, zebra stripes, and other features that repeat often over small distances, can be poor candidates. Feature sparsity may also simplify correspondence tasks.

In addition, the feature module 201 can further determine whether a feature is applicable to a plurality of different geographic regions. If a selected feature is specific only to a particular area, then the resulting trained machine learning model would be applicable only to that particular area. By contrast, feature generalization allows for applicability in different parts or regions of the world. Therefore, in some aspects, the feature module 201 may also be configured to select features that occur in all, or a majority (e.g., greater than a threshold percentage) of the areas or regions that are of interest.

In some aspects, selected features may be used to identify and designate target points in imagery (e.g. ground points or ground control points). To do so, the feature module 201 may retrieve a plurality of ground truth images depicting selected features. The ground truth images may be labeled with known pixel location data of the features as respectively depicted in each of the plurality of ground truth images. The known pixel location data indicate which pixel(s) of a ground truth image correspond to target points present in the image. The known pixel location data can be used to determine pixel correspondences between multiple images to determine real world 3D coordinates (e.g. latitude, longitude, and elevation) of the target points. The ground truth images can also include multiple images of the same point, or other learnable feature. Such images may be captured at different times, with different sources, and from different perspectives.

To label pixel location data, the feature module 201 may execute various recognition algorithms identifying image pixels associated with target features. In some implementations, pixel locations of each target feature (e.g., an intersection feature) are identified in two or more images, and a pixel correspondence of the form $\{(u_1, v_1), (u_2, v_2), \ldots\}$ or equivalent is created. Here, u and v are pixel locations of the same feature depicted in the images (e.g., pixel locations along the x and y axis respectively of a pixel grid forming the image), and the subscript corresponds to the image in which the feature is being labeled. Pixel correspondences, together with image metadata (e.g. camera position, orientation, focal length, etc.) can then be used to estimate 3D coordinates of the intersection feature/target points.

In some aspects, ground truth data may be generated once target features or points are defined. In particular, a large set of annotated or human-created observations (e.g., ground truth images depicting intersections features) may be produced and accessed. Correspondences among detected points can be determined by human labelers (perhaps with visual aids to orient and co-register multiple images) or through automated means (brute-force matching, approximate nearest neighbors, supervised deep neural networks, etc.). The output of this process may be a set of ground truth images labeled with the features or target points.

The machine learning system 103 in FIG. 2 may also include a training module 203, as shown. The training module 203 may access or receive ground truth image data, and train a machine learning model (e.g. a deep convolutional network, a neural network, a set of equations, rules, decision trees, and so forth) using the data. In some implementations, the training module 203 may be configured to train features for the machine learning model that include pixel information (e.g. pixel correspondences or pixel locations) of the target points (e.g. ground points or ground control points) determined in the ground truth images.

Generally, machine learning models are trained to manipulate an input feature set in order to make a prediction about the feature set or the phenomenon/observation that the feature set represents. However, the quality of ground truth data used for training can vary depending on the source, and may lead to uncertainty or error. For example, satellite and aerial source camera sensors can provide imagery with different resolutions. Therefore, in some aspects, the training module 203 may train machine learning models to calculate uncertainties based on the source of data (e.g. camera resolution, camera pose, and so forth).

In some embodiments, the training module 203 can incorporate a supervised learning model (e.g., a logistic regression model, RandomForest model, and/or any equivalent model) to train a machine learning model using the ground truth image data together with the labeled target points (e.g. ground points or ground control points). For example, during training, the training module 203 may use a learner module that feeds images and derived feature sets (e.g., pixel correspondences, image attributes, etc.) into the machine learning model to compute a predicted feature set (e.g., predicted target points presented in input images and/or other characteristics of target points) using an initial set of model parameters.

The learner module may then compare the predicted feature set to the ground truth data (e.g., images labeled with known ground point or ground control point pixel locations and/or attributes). For example, the learner module may compute a loss function representing, for instance, an accuracy of the predictions for the initial set of model parameters. In some aspects, the training module 203 may compute a loss function for the training of the machine learning module based on the ground truth images. The learner module of the training module 203 may then incrementally adjust the model parameters until the model minimizes the loss function (e.g., achieves a maximum accuracy with respect to the manually marked labels). In other words, a "trained" feature prediction model may be a classifier with model parameters adjusted to make accurate predictions with respect to the ground truth data.

The prediction module 205 may be configured to access or receive one or more input images that depict potential learnable features (e.g., intersection features), as described. In one embodiment, the input image data may include terrestrial imagery (e.g. captured using on a drive vehicle) or top-down imagery (e.g., captured by cameras mounted on satellites, airplanes, drones, and/or other aerial vehicles). The prediction module 205 can then process the input image data to identify target points (e.g. ground points or ground control points). The processing may be carried out, for instance, using the computer vision or equivalent approach to recognize pixels, and their respective coordinates, corresponding to the features/target points of interest. If the input includes multiple images (e.g., two or more) of the same feature or target point, the prediction module 205 may also create pixel correspondences of the feature across the images, as described above.

The prediction module 205 may create an input vector, input matrix, or equivalent comprising pixel location/pixel correspondences, along with any other features/attributes used to train the machine learning model. By way of example, such features/attributes may include images, attributes derived from the images (e.g., camera resolution, exposure, position, focal length, type, etc.), sources (e.g., satellite, airplane, drone, etc.), contextual information (e.g., time, weather and other conditions present during data capture), and so forth. In some aspects, creating the input vector may include converting the detected features to a common format, normalizing values, removing outliers, and/or any other pre-processing steps that would reduce data anomalies in the input data.

The prediction module 205 may then process the input vector using the trained machine learning model to output one or more predicted pixel locations of the target points/features present in the input image. In one embodiment, coordinates for the predicted target point(s) or feature(s) can also include a predicted uncertainty or error associated with it (e.g., error in predicted pixel location of a ground point or ground point).

As shown in FIG. 2, the machine learning system 103 may also include a triangulation module 207. The triangulation module 207 may be configured to carry out a triangulation process to estimate coordinates of various detected target points or features. To do so, the triangulation module 207 may determine pixel correspondences between the same target points, for instance, as depicted in multiple images. 3D coordinates (e.g. latitude, longitude, and elevation) of the target points or features may then be estimated from the pixel correspondences and metadata associated with the labeled images. For instance, the triangulation process may utilize a variety of information associated with the camera(s) utilized to acquire the images, such as camera location, camera orientation or pose, as well as other camera attributes (e.g., camera model, focal length, etc.).

Target points or features identified as detailed above could be used for a variety of applications. For instance, in accordance with aspects of the present disclosure, positional differences between identified ground points and ground control points may be used to quantify a quality of acquired terrestrial data (e.g. terrestrial image data, LiDAR data, depth data, and so forth), and control mapping information inaccuracies. In addition, such target points or features may serve for object localization. For example, autonomous driving has become an area of intense interest, and localization of autonomous vehicles with high accuracy is critical in this application. Thus, ground control points, known with high accuracy, may be used as reference markers by such vehicles.

In general, a localization accuracy of around 10 cm is needed for safe driving (e.g., autonomous driving) in many areas. One way to achieve this level of accuracy is to use visual odometry, in which features (e.g., ground control points) are detected from imagery using feature prediction models (i.e., a machine learning classifier). These features can then be matched to a database of ground control points to determine one's location. By way of example, traditional feature-based localization that both detect features and localize against them generally rely on low-level features. However, low-level features typically used in these algorithms (e.g., Scale-Invariant Feature Transform (SIFT) or Oriented FAST and rotated BRIEF (ORB)) tend to be brittle and not persist in different environmental and lighting conditions. As a result, often they cannot be used to localize a vehicle on different days in different weather conditions. Aside from reproducibility, the ability to detect and store higher level features of different types (e.g., ground control points based on intersection features such as lane markings, lane lines, etc.), in accordance with aspects of the present disclosure, can provide improved and more accurate localization.

An autonomous vehicle, for instance, can use computer vision to identify a known ground control point (e.g., a crosswalk corner), and then estimate its distance to the ground control point. Because the location of the ground control point is known with high accuracy, the vehicle can compute its distance to the ground control point, and use the distance to localize itself with a corresponding high degree of accuracy. Understanding one's location on a map enables planning of a route, both on fine and coarse scales. On a coarse scale, navigation maps allow vehicles to know what roads to use to reach a particular destination. On a finer scale, maps allow vehicles to know what lanes to occupy, and when to make lane changes. This information is important for planning efficient and safe routes, and for providing guidance in complicated environments. In addition, localization with respect to ground control points enables the incorporation of other real-time information into route planning. Such information could include traffic, areas with unsafe driving conditions (ice, fog, potholes, e.g.), and temporary road changes like construction.

Of course, many other applications may also be possible. For instance, ground control points may be used in camera pose refinement of satellite, aerial and ground imagery, and thereby providing enhanced position fidelity for location data determined from these data sources.

Figure 4:
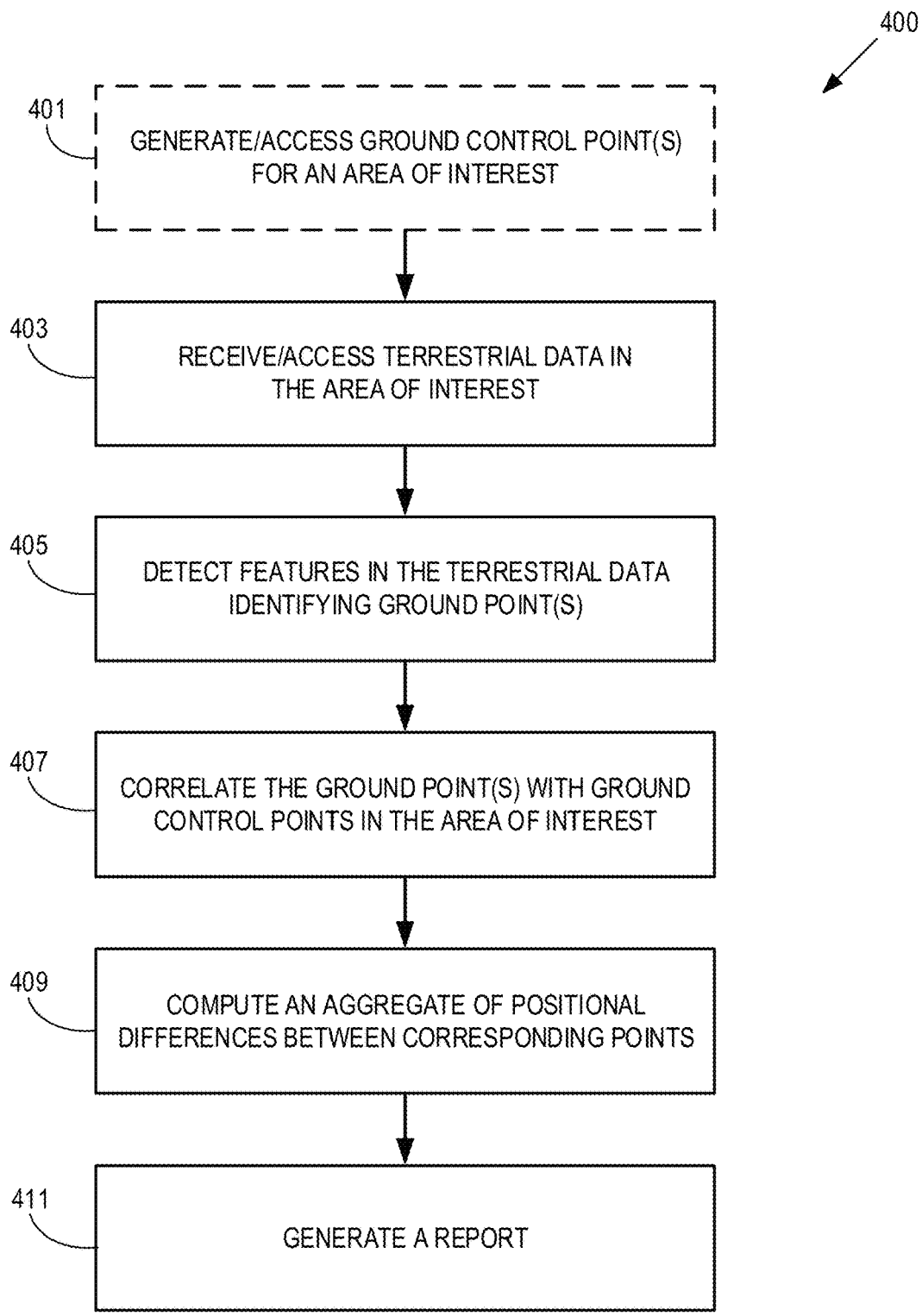
FIG. 4 is a flowchart setting forth steps of a process, in accordance with aspects of the present disclosure.

Turning now to FIG. 4, a flowchart setting forth steps of a process 400, in accordance with aspects of the present disclosure, is illustrated. Steps of the process 400 may be carried out using any combination of suitable devices or systems, as well as using systems described in the present disclosure. In some embodiments, steps of the process 400 may be implemented as instructions stored in non-transitory computer readable media, as a program, firmware or software, and executed by a general-purpose, programmed or programmable computer, processer or other computing device. In other embodiments, steps of the process 400 may be hardwired in an application-specific computer, processer, dedicated system, or module, as described with reference to FIGS. 1 and 2. Although the process 400 is illustrated and described as a sequence of steps, it is contemplated that the steps may be performed in any order or combination, and need not include all of the illustrated steps.

The process 400 may optionally begin at process block 401 with generating ground control points for an area of interest. Alternatively, ground control points may be accessed from a data storage location (e.g. the geographic database 107 shown in FIG. 1) In particular, the ground control points may include specific 3D coordinates or locations (e.g., latitude, longitude, and elevation) measured with respect to distinguishable landmarks on the Earth (e.g. intersections, parts of signs, barriers, buildings, road paint, and so on). As appreciated from description below, ground control points may be used to provide a ground truth or reference for determining a quality of terrestrial data, and controlling mapping information inaccuracies.

Ground control points may be obtained using various survey techniques. For instance, it is common that ground surveyors with various instruments (e.g. theodolite, measuring tape, 3D scanners, satellite-based location sensors, levels, rods, and so on) are dispatched to an area of interest to measure ground control points with high accuracy. However, substantial effort and resources may be required to survey large areas. In addition, if ground control points are measured on the road (e.g., for map making), special access permissions from government or other responsible authorities might be needed. Because of the infrastructure and cost burden, obtaining ground control points using surveyors may be not scalable, particularly for map making and quality evaluation.

To complicate matters further, ground control points are valid for unpredictable periods of time. For example, a previously measured ground control point can become invalid or obsolete if the feature or object (e.g., a building, lane marking, etc.) upon which it is based changes, for instance, due to construction, paint deterioration, and/or other changes to the environment. Other changes may be due, for instance, to tectonic plate or other geological movements, which can shift the location of ground control points by a few centimeters or more per year. For high definition maps (e.g., with centimeter level accuracy), such changes can have an important effect on the accuracy of digital maps. Therefore, in some aspects, ground control points may be generated by analyzing top-down imagery (e.g. aerial, drone, satellite, and so on) using machine learning. However, the approach and imagery used for generating ground control points may depend on the desired accuracy, as well as the extent of the area of interest.

At process block 403, terrestrial data corresponding to the area of interest may be received or accessed. The terrestrial data may be captured in real-time and/or obtained from, for example, the geographic database 107, the vehicle 105, or a content provider 111, as described with reference to FIG. 1, as well as from elsewhere (e.g. a memory, server, and so forth). In some aspects, terrestrial data may include terrestrial image data captured by drive vehicles, stationary cameras near the ground, and other sources. The image data may include multiple images depicting the same feature(s) captured from different perspectives and/or using different sources. The terrestrial data may also include Light Detection and Ranging (LiDAR), depth data, and other types of terrestrial data.

The terrestrial data may then be analyzed at process block 405. Specifically, target features may be detected in the terrestrial data to identify one or more ground points. As described, this step may include utilizing a feature detection algorithm (e.g. a trained machine learning algorithm) configured to detect the target features and identify the ground points, as described. Advantageously, the target features may include learnable feature (e.g. intersection features). In some aspects, the feature detection algorithm may be trained to operate on the specific terrestrial data utilized (e.g. image data, depth data, and so forth). A triangulation process may be performed to obtain the 3D coordinates of the ground points identified. In some aspects, the uncertainties of the ground points may be estimated, as described.

The identified ground points may then be correlated to ground control points in the area of interest at process block 407. This step may include searching for ground control points within a predetermined radius or a distance away from the identified ground points (e.g. approximately 1 meter, or less, or more). The predetermined radius or distance may depend upon the resolution or location accuracy with which the ground control points are known, as well as other factors. Also, in addition to position information (i.e. 3D coordinates), other information may also be used to determine whether identified ground points correlate or correspond to particular ground control points.

Differences between the ground points and ground control points may then be combined into an aggregate indicative of the quality of the terrestrial data captured in the area of interest. To compute the aggregate, positional differences (i.e. shifts in 3D coordinates) between corresponding points may be determined, as indicated by process block 409. The aggregate may then be calculated by summing or by averaging the positional differences. In some aspects, the aggregate may reflect uncertainties in the points.

A report may then be generated, as indicated by process block 411. The report may be in any form, and provide various information. In some implementations, the report may be in the form of visual and/or audio signals, images, tabulated information and data, instructions, and combinations thereof. The report may be communicated to a user or operator by way of a display, speakers, or other means of output, as well as to various devices or systems for further steps, analysis or processing. In some aspects, the report may be provided in real-time (e.g. substantially as data is being captured). The report, and various data and information therein, may also be stored (e.g. in a memory, a database, a server, and so forth). In some aspects, data and information provided in the report may be used to control mapping information inaccuracies. That is, based on the quality of terrestrial data, various mapping information derived therefrom may be appropriately considered (e.g. updated, corrected, and so forth).

In some aspects, the report may provide a value for the computed aggregate. As described, the aggregate may be used to indicate a quality of captured terrestrial data. In addition, the aggregate may be used for camera pose refinement, and other applications. The report may also provide information (e.g. locations or 3D coordinates, and uncertainties, and so forth) associated with detected features and/or ground points identified in the area of interest. The report may further provide information associated with ground control points in the area of interest, as well as indicate their presence, for example, relative to a position (e.g. of a vehicle).

In some aspects, the report may indicate, or provide information with regard to correspondences found. In addition, the report may also indicate ground points for which no corresponding ground control point is found. These points may be marked in the report with an "unknown" accuracy, or the like, and flagged as being unusable for certain applications (e.g. map making applications with strict accuracy requirements). In addition, the report may also provide a recommendation for using manual alternatives (e.g. using surveying methods) to measure the quality of such ground points.

Figure 5:
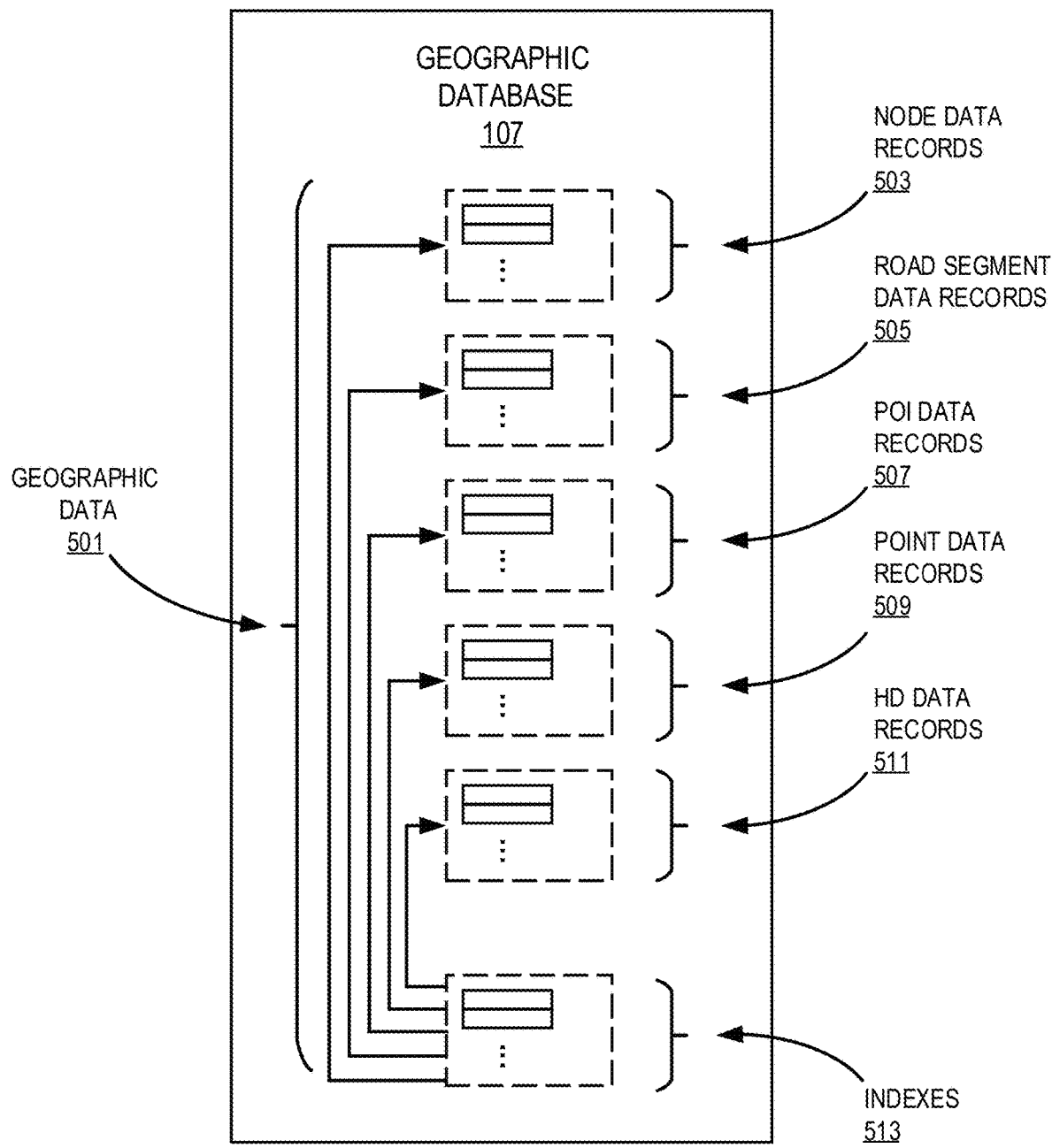
FIG. 5 is a diagram of an example geographic database, in accordance with aspects of the present disclosure.

Turning now to FIG. 5, a diagram of a geographic database 107, according to aspects of the present disclosure, is shown. As shown, the geographic database 107 may include a variety of geographic data 501 tabulated in various arrangements, and used in various applications. For example, the geographic data 501 may be used for (or configured to be compiled to be used for) mapping and/or navigation-related services. As shown in FIG. 1, the geographic data 501 may include node data records 503, road segment data records 505, point of interest (POI) data records 507, point data records 509, high definition (HD) mapping data records 511, and indexes 513, for example. The geographic data 501 may include more, fewer or different data records. In some embodiments, additional data records not shown in FIG. 5 may also be included, such as cartographic ("carto") data records, routing data records, maneuver data records, and other data records.

In particular, the HD mapping data records 511 may include a variety of data, including data with resolution sufficient to provide centimeter-level or better accuracy of map features. For example, the HD mapping data may include data captured using LiDAR, or equivalent technology capable large numbers of 3D points, and modelling road surfaces and other map features down to the number lanes and their widths. In one embodiment, the HD mapping data (e.g., HD data records 511) capture and store details such as the slope and curvature of the road, lane markings, roadside objects such as sign posts, including what the signage denotes. By way of example, the HD mapping data enable highly automated vehicles to precisely localize themselves on the road.

In some implementations, geographic features (e.g., two-dimensional or three-dimensional features) may be represented in the geographic database 107 using polygons (e.g., two-dimensional features) or polygon extrusions (e.g., three-dimensional features). For example, the edges of the polygons correspond to the boundaries or edges of the respective geographic feature. In the case of a building, a two-dimensional polygon can be used to represent a footprint of the building, and a three-dimensional polygon extrusion can be used to represent the three-dimensional surfaces of the building. It is contemplated that although various embodiments are discussed with respect to two-dimensional polygons, it is contemplated that the embodiments are also applicable to three-dimensional polygon extrusions. Accordingly, the terms polygons and polygon extrusions as used herein can be used interchangeably.

In one embodiment, the following terminology applies to the representation of geographic features in the geographic database 107:

"Node"—A point that terminates a link.

"Line segment"—A straight line connecting two points.

"Link" (or "edge")—A contiguous, non-branching string of one or more line segments terminating in a node at each end.

"Shape point"—A point along a link between two nodes (e.g., used to alter a shape of the link without defining new nodes).

"Oriented link"—A link that has a starting node (referred to as the "reference node") and an ending node (referred to as the "non reference node").

"Simple polygon"—An interior area of an outer boundary formed by a string of oriented links that begins and ends in one node. In one embodiment, a simple polygon does not cross itself.

"Polygon"—An area bounded by an outer boundary and none or at least one interior boundary (e.g., a hole or island). In one embodiment, a polygon is constructed from one outer simple polygon and none or at least one inner simple polygon. A polygon is simple if it just consists of one simple polygon, or complex if it has at least one inner simple polygon.

In some implementations, certain conventions or rules may be followed in the geographic database 107. For example, links may not cross themselves or each other except at a node. In another example, shape points, nodes, or links may not be duplicated. In yet another example, two links that connect each other may have a common node. In the geographic database 107, overlapping geographic features are represented by overlapping polygons. When polygons overlap, the boundary of one polygon crosses the boundary of the other polygon.

In the geographic database 107, the location at which the boundary of one polygon intersects the boundary of another polygon may be represented by a node. In one embodiment, a node may be used to represent other locations along the boundary of a polygon than a location at which the boundary of the polygon intersects the boundary of another polygon. In one embodiment, a shape point may not be used to represent a point at which the boundary of a polygon intersects the boundary of another polygon.

In exemplary embodiments, the road segment data records 505 may be links or segments representing roads, streets, or paths, as can be used in the calculated route or recorded route information for determination of one or more personalized routes. The node data records 503 may be end points corresponding to the respective links or segments of the road segment data records 505. The road link data records 505 and the node data records 503 may represent a road network, as used by vehicles, cars, and/or other entities, for instance. Alternatively, the geographic database 107 may contain path segment and node data records or other data that represent pedestrian paths or areas in addition to or instead of the vehicle road record data, for example.

The road/link segments and nodes can be associated with attributes, such as functional class, a road elevation, a speed category, a presence or absence of road features, geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database 505 can include data about the POIs and their respective locations in the POI data records 507. The geographic database 107 can also include data about places, such as cities, towns, or other communities, and other geographic features, such as bodies of water, mountain ranges, etc. Such place or feature data can be part of the POI data records 507 or can be associated with POIs or POI data records 507 (such as a data point used for displaying or representing a position of a city).

As shown in FIG. 5, the geographic database 107 may also include point data records 509 for storing the point data (e.g. ground points or ground control points), learnable map features, as well as other related data used according to the various embodiments described herein. In addition, the point data records 509 can also store ground truth training and evaluation data, machine learning models, annotated observations, and/or any other data. By way of example, the point data records 509 can be associated with one or more of the node records 503, road segment records 505, and/or POI data records 507 to support localization or visual odometry based on the features stored therein and the corresponding estimated quality of the features. In this way, the records 509 can also be associated with or used to classify the characteristics or metadata of the corresponding records 503, 505, and/or 507.

As discussed above, the HD mapping data records 511 may models of road surfaces and other map features to centimeter-level or better accuracy. The HD mapping data records 511 may also include models that provide the precise lane geometry with lane boundaries, as well as rich attributes of the lane models. These rich attributes may include, but are not limited to, lane traversal information, lane types, lane marking types, lane level speed limit information, and/or the like. In one embodiment, the HD mapping data records 511 may be divided into spatial partitions of varying sizes to provide HD mapping data to vehicles and other end user devices with near real-time speed without overloading the available resources of these vehicles and devices (e.g., computational, memory, bandwidth, etc. resources).

In some implementations, the HD mapping data records 511 may be created from high-resolution 3D mesh or point-cloud data generated, for instance, from LiDAR-equipped vehicles. The 3D mesh or point-cloud data may be processed to create 3D representations of a street or geographic environment at centimeter-level accuracy for storage in the HD mapping data records 511.

In one embodiment, the HD mapping data records 911 also include real-time sensor data collected from probe vehicles in the field. The real-time sensor data, for instance, integrates real-time traffic information, weather, and road conditions (e.g., potholes, road friction, road wear, etc.) with highly detailed 3D representations of street and geographic features to provide precise real-time also at centimeter-level accuracy. Other sensor data can include vehicle telemetry or operational data such as windshield wiper activation state, braking state, steering angle, accelerator position, and/or the like.

The geographic database 107 may be maintained by content provider in association with a services platform (e.g., a map developer), as described with reference to FIG. 1. The map developer can collect geographic data to generate and enhance the geographic database 107. The data may be collected in various ways by the map developer, including obtaining data from other sources, such as municipalities or respective geographic authorities. In addition, the map developer can employ field personnel to travel by vehicle along roads throughout the geographic area of interest to observe features and/or record information about them, for example. Also, remote sensing, such as aerial or satellite photography, can be used.

In some implementations, the geographic database 107 can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data may be compiled (such as into a platform specification format (PSF) format) to organize and/or configure the data for performing navigation-related functions and/or services, such as route calculation, route guidance, map display, speed calculation, distance and travel time functions, and other functions, by a navigation device of a vehicle, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

The indexes 513 in FIG. 5 may be used improve the speed of data retrieval operations in the geographic database 107. Specifically, the indexes 513 may be used to quickly locate data without having to search every row in the geographic database 107 every time it is accessed. For example, in one embodiment, the indexes 513 can be a spatial index of the polygon points associated with stored feature polygons.

Figure 6:
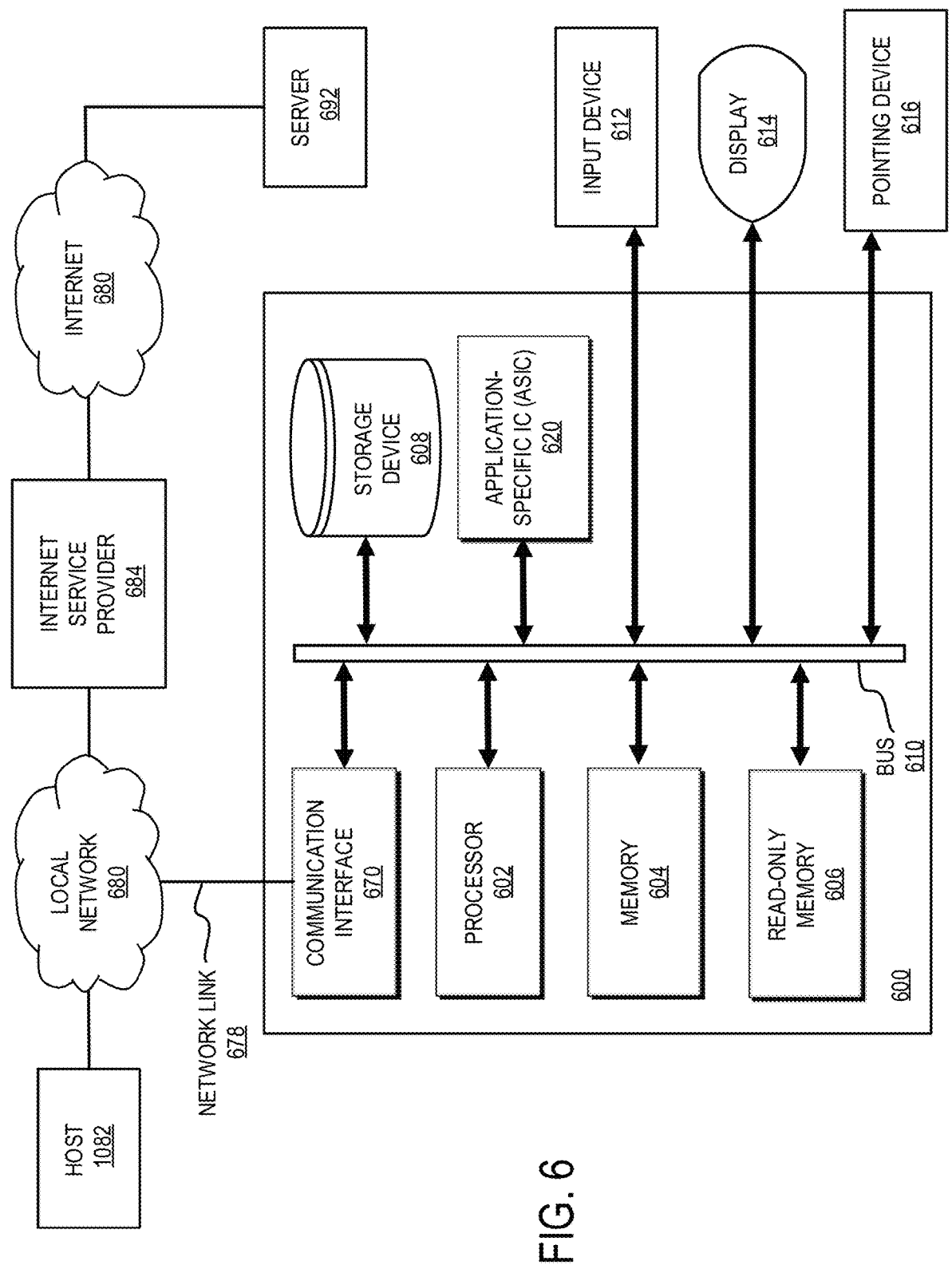
FIG. 6 is a diagram of an example computer system, in accordance with aspects of the present disclosure.

An example computer system 600, in accordance with aspects of the present disclosure, is illustrated in FIG. 6. The computer system 600 may be programmed (e.g., via computer program code or instructions) to perform a variety of steps, including steps for identifying the quality of terrestrial data, in accordance with methods described herein.

As shown in FIG. 6, the computer system 600 may generally include a processor 602, which may be configured to perform a set of operations on information as specified by computer program code. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). In some aspects, the set of operations may include bringing information in from a bus 610 and placing information on the bus 610. The set of operations may also include comparing two or more units of information, shifting positions of units of information, and combining two or more units of information, such as by addition or multiplication or logical operations like OR, exclusive OR (XOR), and AND. Each operation of the set of operations performed by the processor 602 may be represented to the processor 602 by information called instructions, such as an operation code of one or more digits. The sequence of operations to be executed by the processor 602, such as a sequence of operation codes, constitute processor 602 instructions, may also be called computer system 600 instructions or, simply, computer instructions. The processor 602 may include multiple processors, units or modules, and may be implemented as mechanical, electrical, magnetic, optical, chemical or quantum components, among others, or any combination thereof.

As shown in FIG. 6, the computer system 600 may also include a memory 604 coupled to bus 610. The memory 604, such as a random-access memory (RAM) or other dynamic storage device, may be configured to store a variety of information and data, including processor instructions for carrying steps in accordance with aspects of the disclosure. Dynamic memory allows information stored therein to be changed by the computer system 600. The RAM allows a unit of information stored at a location called a memory address to be stored and retrieved independently of information at neighboring addresses. The memory 604 may also be used by the processor 602 to store temporary values during execution of processor instructions.

The computer system 600 may also include a read-only memory (ROM) 606, or other static storage device, coupled to the bus 610. The ROM 606 may be configured for storing static information, including instructions, that is not changed by the computer system 600. Some memory 604 includes volatile storage that loses the information stored thereon when power is lost. Also coupled to bus 610 is a non-volatile (persistent) storage device 608, such as a magnetic disk, optical disk or flash card, for storing information, including instructions, that persists even when the computer system 600 is turned off or otherwise loses power.

As mentioned, the bus 610 may be configured for passing information and data between internal and external components of the computer system 600. To do so, the bus 610 may include one or more parallel conductors that facilitate quick transfer of information and data among the components coupled to the bus 610. The information and data may be represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, may represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, analog data may be represented by a near continuum of measurable values within a particular range.

Information, including instructions for identifying the quality of terrestrial data, may be provided to the bus 610 for use by the processor 602 from an external input device 612, such as a keyboard or a sensor. The sensor may be configured to detect conditions in its vicinity and transform those detections into physical expression compatible with the measurable phenomenon used to represent information in computer system 600. Other external devices coupled to bus 610, used primarily for interacting with humans, may include a display device 614, such as a cathode ray tube (CRT) or a liquid crystal display (LCD), or plasma screen or printer for presenting text or images, as well as a pointing device 616 (e.g. a mouse, trackball, cursor direction keys, motion sensor, etc) for controlling a position of a small cursor image presented on the display 614 and issuing commands associated with graphical elements presented on the display 614. In some embodiments, for example, the computer system 600 performs all functions automatically without human input. As such, one or more of external input device 612, display device 614 and pointing device 616 may be omitted.

As shown in FIG. 6, special purpose hardware, such as an application specific integrated circuit (ASIC) 620, may be coupled to bus 610. The special purpose hardware may be configured to perform specialized operations. Examples of ASICs include graphics accelerator cards for generating images for display 614, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

The computer system 600 may also include one or more instances of a communications interface 670 coupled to bus 610. The communication interface 670 may provide a one-way or two-way communication coupling to a variety of external devices that operate with their own processors, such as printers, scanners and external disks. In addition, the communication interface 670 may provide a coupling to a local network 680, by way of a network link 678. The local network 680 may provide access to a variety of external devices and systems, each having their own processors and other hardware, as shown in FIG. 6.

By way of example, the communication interface 670 may include a parallel port or a serial port or a universal serial bus (USB) port on a personal computer. In some embodiments, the communications interface 670 may include one or more integrated services digital network (ISDN) cards, or digital subscriber line (DSL) cards, or telephone modems that provides an information communication connection to a corresponding type of telephone line. In some embodiments, the communication interface 670 may include a cable modem that converts signals on bus 610 into signals for a communication connection over a coaxial cable or into optical signals for a communication connection over a fiber optic cable. As another example, the communications interface 670 may be a local area network (LAN) card configured to provide a data communication connection to a compatible LAN, such as Ethernet. Wireless links may also be implemented. For wireless links, the communications interface 670 may send and/or receive electrical, acoustic or electromagnetic signals, including infrared and optical signals, that carry information streams, including digital data. For example, in wireless handheld devices (e.g. mobile telephones, cell phones, and so forth), the communications interface 670 may include a radio band electromagnetic transmitter and receiver called a radio transceiver. In certain embodiments, the communications interface 670 enables connection to the communication network, as described with reference to FIG. 1.

As used herein, computer-readable media refers to any media that participates in providing information to processor 602, including instructions for execution. Such media may take many forms, and include non-volatile media, volatile media, transmission media, and others. Non-volatile media include, for example, optical or magnetic disks, such as storage device 608. Volatile media include, for example, dynamic memory 604. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

Figure 7:
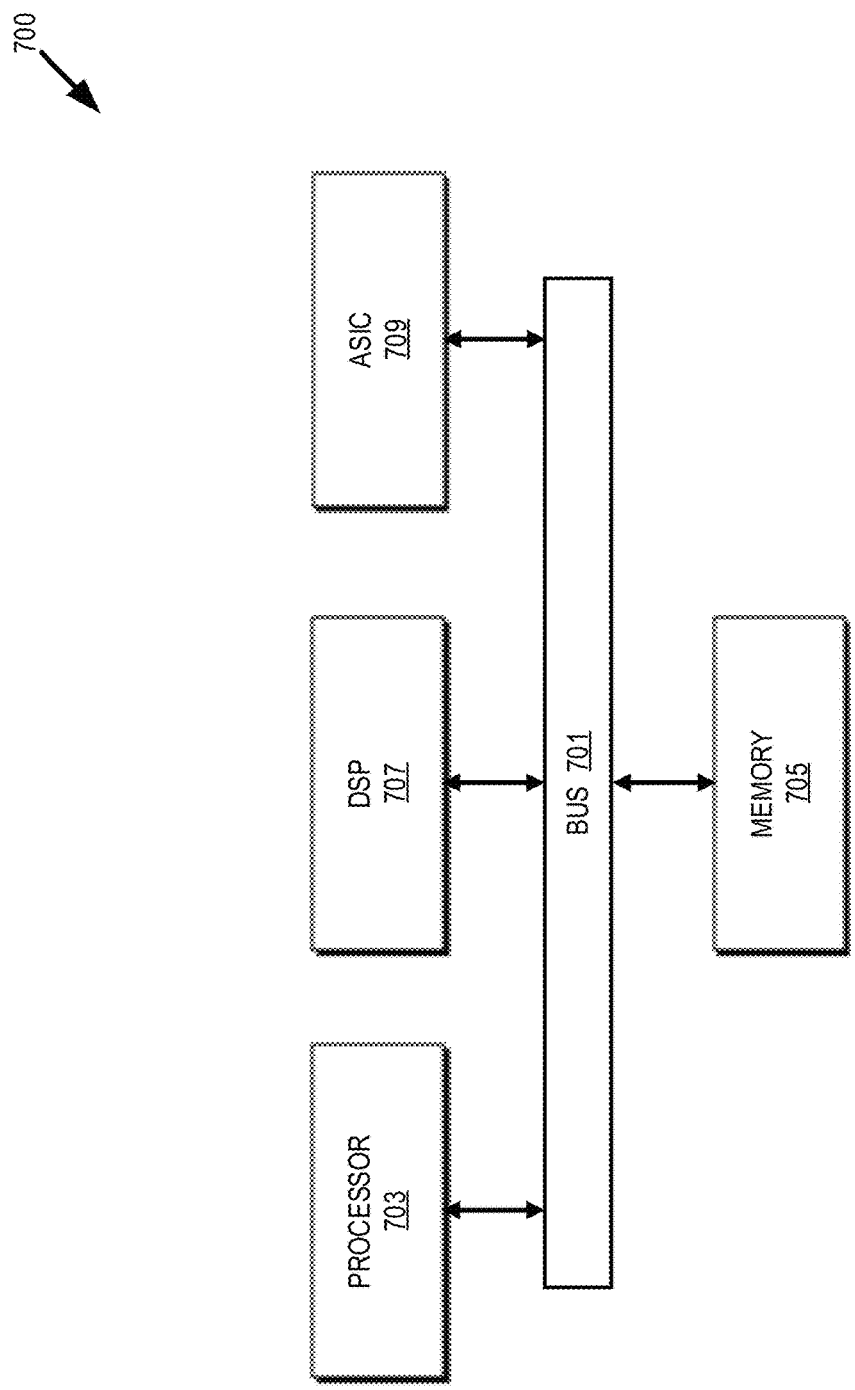
FIG. 7 is a diagram of an example chip set, in accordance with aspects of the present disclosure.

Turning now to FIG. 7, a chip set 700, in accordance with aspects of the present disclosure, is illustrated. In some implementations, the chip set 700 may be programmed to carry out steps in accordance with methods described herein, and may include various components (e.g. as described with respect to FIG. 6) incorporated in one or more physical packages (e.g., chips). By way of example, a physical package includes an arrangement of one or more materials, components, and/or wires on a structural assembly (e.g., a baseboard) that provides one or more characteristics, such as physical strength, conservation of size, and/or limitation of electrical interaction. It is contemplated that in certain embodiments the chip set 700 can be implemented in a single chip.

As shown, the chip set 700 may include a communication mechanism, such as a bus 701 for passing information and data among the components of the chip set 1100. A processor 703 connected to the bus 701 may be configured to execute instructions and process information stored in, for example, a memory 705. The processor 703 may include one or more processing cores, with each core capable of performing independently. In some implementations, a multi-core processor may be used, which enables multiprocessing within a single physical package. Examples of a multi-core processor include two, four, eight, or greater numbers of processing cores. Alternatively, or additionally, the processor 703 may include one or more microprocessors configured in tandem, via the bus 701, to perform independent execution of instructions, pipelining, and multithreading.

The chip set 700 may also include specialized components configured to perform certain processing functions and tasks. For instance, the chip set 700 may include one or more digital signal processors (DSP) 707, or one or more application-specific integrated circuits (ASIC) 709, or both. In particular, the DSP 707 may be configured to process real-world signals (e.g., sound) in real time independently of the processor 703. Similarly, the ASIC 709 may be configured to performed specialized functions not easily performed by a general-purpose processor. Other specialized components to aid in performing the inventive functions described herein may include one or more field programmable gate arrays (FPGA) (not shown), one or more controllers (not shown), or one or more other special-purpose computer chips.

The processor 703 and accompanying components may have connectivity to the memory 705 via the bus 701, as shown. The memory 705 may include dynamic memory (e.g., RAM, magnetic disk, writable optical disk, etc.), static memory (e.g., ROM, CD-ROM, etc.), and others, configured for storing executable instructions. The instructions, when executed, perform a variety of steps, including steps for identifying the quality of terrestrial data, in accordance with methods described herein. The memory 705 may also store the data associated with or generated by the execution.

Figure 8:
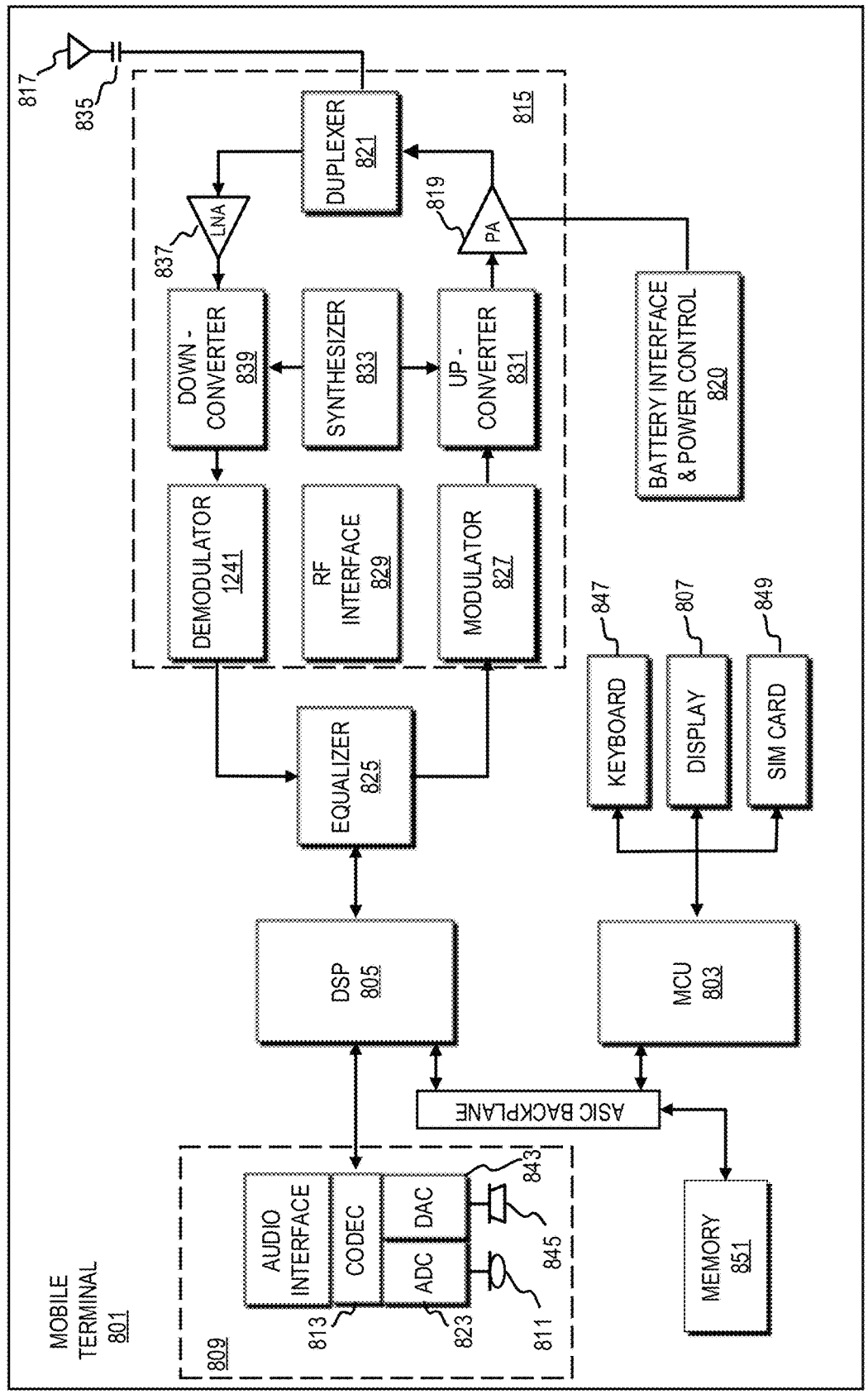
FIG. 8 is a diagram of an example mobile terminal, in accordance with aspects of the present disclosure.

Turning now to FIG. 8, a diagram of example mobile terminal 801, in accordance with aspects of the present disclosure, is shown. In some implementations, the mobile terminal 810 may be an embedded component of the vehicle 105 or UE 109, as described with reference to FIG. 1.

In general, the mobile terminal 801 may include a Main Control Unit (MCU) 803, a Digital Signal Processor (DSP) 805, and a receiver/transmitter unit including a microphone gain control unit and a speaker gain control unit. A display 807 provides feedback to user in support of various applications and functions of the mobile terminal 801. The mobile terminal 801 may also include audio function circuitry 809, including a microphone 811 and microphone amplifier that amplifies the sound signal output from the microphone 811. The amplified sound signal output from the microphone 811 is fed to a coder/decoder (CODEC) 813.

The mobile terminal 801 may also include a radio section 815, which amplifies power and converts frequency in order to communicate with a base station, which is included in a mobile communication system, via antenna 817. Generally, a radio receiver is often defined in terms of front-end and back-end characteristics. The front-end of the receiver encompasses all of the Radio Frequency (RF) circuitry whereas the back-end encompasses all of the base-band processing circuitry. The power amplifier (PA) 819 and the transmitter/modulation circuitry are operationally responsive to the MCU 803, with an output from the PA 819 coupled to the duplexer 821 or circulator or antenna switch, as known in the art. The PA 819 also couples to a battery interface and power control unit 820.

In use, a user of mobile station 801 speaks into the microphone 811 and his or her voice along with any detected background noise is converted into an analog voltage. The analog voltage is then converted into a digital signal through the Analog to Digital Converter (ADC) 823. The MCU 803 routes the digital signal into the DSP 805 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WiFi), satellite, and the like.

The encoded signals are then routed to an equalizer 825 for compensation of any frequency-dependent impairments that occur during transmission though the air such as phase and amplitude distortion. After equalizing the bit stream, the modulator 827 combines the signal with a RF signal generated in the RF interface 829. The modulator 827 generates a sine wave by way of frequency or phase modulation. In order to prepare the signal for transmission, an up-converter 831 combines the sine wave output from the modulator 827 with another sine wave generated by a synthesizer 833 to achieve the desired frequency of transmission. The signal is then sent through a PA 819 to increase the signal to an appropriate power level. In practical systems, the PA 819 acts as a variable gain amplifier whose gain is controlled by the DSP 805 from information received from a network base station. The signal is then filtered within the duplexer 821 and optionally sent to an antenna coupler 835 to match impedances to provide maximum power transfer. Finally, the signal is transmitted via antenna 817 to a local base station. An automatic gain control (AGC) can be supplied to control the gain of the final stages of the receiver. The signals may be forwarded from there to a remote telephone which may be another cellular telephone, other mobile phone or a landline connected to a Public Switched Telephone Network (PSTN), or other telephony networks.

Voice signals transmitted to the mobile station 801 are received via antenna 817 and immediately amplified by a low noise amplifier (LNA) 837. A down-converter 839 lowers the carrier frequency while the demodulator 841 strips away the RF leaving only a digital bit stream. The signal then goes through the equalizer 825 and is processed by the DSP 805. A Digital to Analog Converter (DAC) 843 converts the signal and the resulting output is transmitted to the user through the speaker 845, all under control of a Main Control Unit (MCU) 803—which can be implemented as a Central Processing Unit (CPU) (not shown).

The MCU 803 receives various signals including input signals from the keyboard 847. The keyboard 847 and/or the MCU 803 in combination with other user input components (e.g., the microphone 811) comprise a user interface circuitry for managing user input. The MCU 803 runs a user interface software to facilitate user control of at least some functions of the mobile station 801 to determine ground control points from image data. The MCU 803 also delivers a display command and a switch command to the display 807 and to the speech output switching controller, respectively. Further, the MCU 803 exchanges information with the DSP 805 and can access an optionally incorporated SIM card 849 and a memory 851. In addition, the MCU 803 executes various control functions required of the station. The DSP 805 may, depending upon the implementation, perform any of a variety of conventional digital processing functions on the voice signals. Additionally, DSP 805 determines the background noise level of the local environment from the signals detected by microphone 811 and sets the gain of microphone 811 to a level selected to compensate for the natural tendency of the user of the mobile station 801.

The CODEC 813 may include the ADC 823 and DAC 843. The memory 851 stores various data including call incoming tone data and is capable of storing other data including music data received via, e.g., the global Internet. The software module could reside in RAM memory, flash memory, registers, or any other form of writable computer-readable storage medium known in the art including non-transitory computer-readable storage medium. For example, the memory 851 may be, but not is limited to, a single memory, CD, DVD, ROM, RAM, EEPROM, optical storage, or any other non-volatile or non-transitory storage medium capable of storing digital data.

An optionally incorporated SIM card 849 may carry, for instance, important information, such as the cellular phone number, the carrier supplying service, subscription details, and security information. The SIM card 849 serves primarily to identify the mobile station 801 on a radio network. The card 849 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order. It should be appreciated that many equivalents, alternatives, variations, and modifications, aside from those expressly stated, are possible and may be considered within the scope of the invention.

The invention claimed is:

1. A method for controlling mapping information inaccuracies, the method comprising:
receiving, by a computer processor, terrestrial data captured in an area of interest;
detecting features in the terrestrial data identifying ground points in the area of interest;
correlating the ground points with ground control points in the area of interest to determine a correspondence;
computing an aggregate of positional differences between corresponding points;
updating at least one database with the computed aggregate, wherein at least one identified ground point is flagged as unusable based, at least in part, on the aggregate; and
generating a report indicating a quality of the terrestrial data captured as determined based on the aggregate in the area of interest.

2. The method of claim 1, wherein the method further comprises receiving terrestrial image data, LiDAR data, depth data, or a combination thereof.

3. The method of claim 1, wherein the method further comprises detecting learnable features.

4. The method of claim 3, wherein the learnable features are selected from a category of intersection features comprising a point where a lane boundary meets a crosswalk, a corner point corresponding to a bus stop, a corner point corresponding to a crosswalk, a gore point where a gore touches a crosswalk, and a gore point where a gore touches a limit line.

5. The method of claim 1, wherein the method further comprises detecting the features in the terrestrial data using a feature detection algorithm.

6. The method of claim 5, wherein the feature detection algorithm utilizes a machine learning model comprising pixel information associated with features visible in a plurality of ground truth images, camera information associated with the plurality of ground truth images, and environmental information associated with the plurality of ground truth images.

7. The method of claim 1, wherein the method further comprises generating the ground control points using top-down imagery comprising a combination of satellite image data and aerial image data.

8. The method of claim 7, wherein the method further comprises:
processing the top-down imagery using a machine learning model to identify the presence of ground control points; and
determining three-dimensional (3D) coordinates for the ground control points using a triangulation process.

9. The method of claim 8, wherein the method further comprises calculating an uncertainty for the 3D coordinates of the ground control points using the machine learning model, camera information and environmental information associated with the imagery.

10. The method of claim 1, wherein the claim further comprises utilizing the report to control mapping information inaccuracies by controlling the pose of at least one camera.

11. A system for controlling mapping information inaccuracies, the system comprising:
at least one processor;
at least one memory comprising instructions executable by the at least one processor, the instructions causing the system to:
receive, by a processor, terrestrial data captured in an area of interest;
detect features in the terrestrial data identifying ground points in the area of interest;
correlate the ground points with ground control points in the area of interest to determine a correspondence;
compute an aggregate of positional differences between corresponding points;
update at least one database with the computed aggregate, wherein at least one identified ground point is flagged as unusable based, at least in part, on the aggregate;
generate a report indicating a quality of the terrestrial data captured as determined based on the aggregate in the area of interest; and
display the report to a user.

12. The system of claim 11, wherein the terrestrial data comprises receiving terrestrial image data, LiDAR data, depth data, or a combination thereof.

13. The system of claim 11, wherein the instructions further cause the system to detect learnable features.

14. The system of claim 13, wherein the learnable features are selected from a category of intersection features comprising a point where a lane boundary meets a crosswalk, a corner point corresponding to a bus stop, a corner point corresponding to a crosswalk, a gore point where a gore touches a crosswalk, and a gore point where a gore touches a limit line.

15. The system of claim 11, wherein the instructions further cause the system to detect the features in the terrestrial data using a feature detection algorithm that utilizes a machine learning model.

16. The system of claim 11, wherein the instructions further cause the system to generate the ground control points using top-down imagery comprising a combination of satellite image data and aerial image data.

17. The system of claim 16, wherein the instructions further cause the system to:
process the top-down imagery using a machine learning model to identify the presence of ground control points; and
determine three-dimensional (3D) coordinates for the ground control points using a triangulation process.

18. The system of claim 17, wherein the instructions further cause the system to calculate an uncertainty for the 3D coordinates of the ground control points using the machine learning model, camera information and environmental information associated with the imagery.

19. The system of claim 11, wherein the instructions cause the system to provide, via the display, an indication to the user to control mapping information inaccuracies in accordance with the quality of the terrestrial data.

20. A non-transitory computer-readable storage medium for controlling mapping information inaccuracies, carrying one or more sequences of one or more instructions which, when executed by one or more processors, cause an apparatus to perform steps to:

receive, by a processor, terrestrial data captured in an area of interest;
detect features in the terrestrial data identifying ground points in the area of interest;
correlate the ground points with ground control points in the area of interest to determine a correspondence;
compute an aggregate of positional differences between corresponding points;
updating at least one database with the computed aggregate, wherein at least one identified ground point is flagged as unusable based, at least in part, on the aggregate; and
generate a report indicating a quality of the terrestrial data captured in the area of interest that is determined using the aggregate.

* * * * *